United States Patent [19]

Schaefer

[11] 4,170,370
[45] Oct. 9, 1979

[54] AUXILIARY WHEELS FOR GOLF CART

[76] Inventor: Cyril L. Schaefer, Box 33, Potosi, Wis. 53820

[21] Appl. No.: 833,801

[22] Filed: Sep. 16, 1977

[51] Int. Cl.$^2$ .............................................. B60S 9/22
[52] U.S. Cl. ................................. 280/400; 280/43.17
[58] Field of Search ............... 280/400, 415 R, 491 A, 280/43, 47, 43.17, 43.22, 43.24, 767; 9/1.2; 172/240, 243, 383, 385; 404/85, 86

[56] References Cited

U.S. PATENT DOCUMENTS

| 3,170,531 | 2/1965  | Katzenberger | 180/6.48 X |
| 3,210,784 | 10/1965 | Krance       | 280/43 X   |
| 3,282,365 | 11/1966 | McReynolds   | 280/415 R  |
| 3,717,362 | 2/1973  | Johnson      | 280/491 A  |
| 3,810,662 | 5/1974  | Commanda     | 280/415 R  |
| 3,905,306 | 9/1975  | Janes        | 280/491 A  |
| 3,982,292 | 9/1976  | Johnson      | 9/1.2      |

Primary Examiner—John A. Pekar
Attorney, Agent, or Firm—Bruce K. Thomas

[57] ABSTRACT

A hitch in combination with a pair of wheel support assemblies is disclosed for the temporary or permanent attachment to the frame of a golf cart. The wheel support assemblies may include identical and interchangeable wheel mounts for each side of the frame including identical stub axles attached to the frame. Each wheel is mounted on an off-set swing axle sub-assembly that includes a tubular recess provided for the receipt and attachment of a bar, such as a jack handle or the tow bar from the hitch, into the recess for the purpose of acting as a lever to pivot the assembly and raise the golf cart upon each wheel individually as the swing axle is rotated on its stub axle mounting. A detachable tow bar is provided for the purpose of raising the front wheel or wheels of the golf cart from the ground while it is being towed. Other embodiments are disclosed including a weighted-locking pin for the assembly.

7 Claims, 12 Drawing Figures

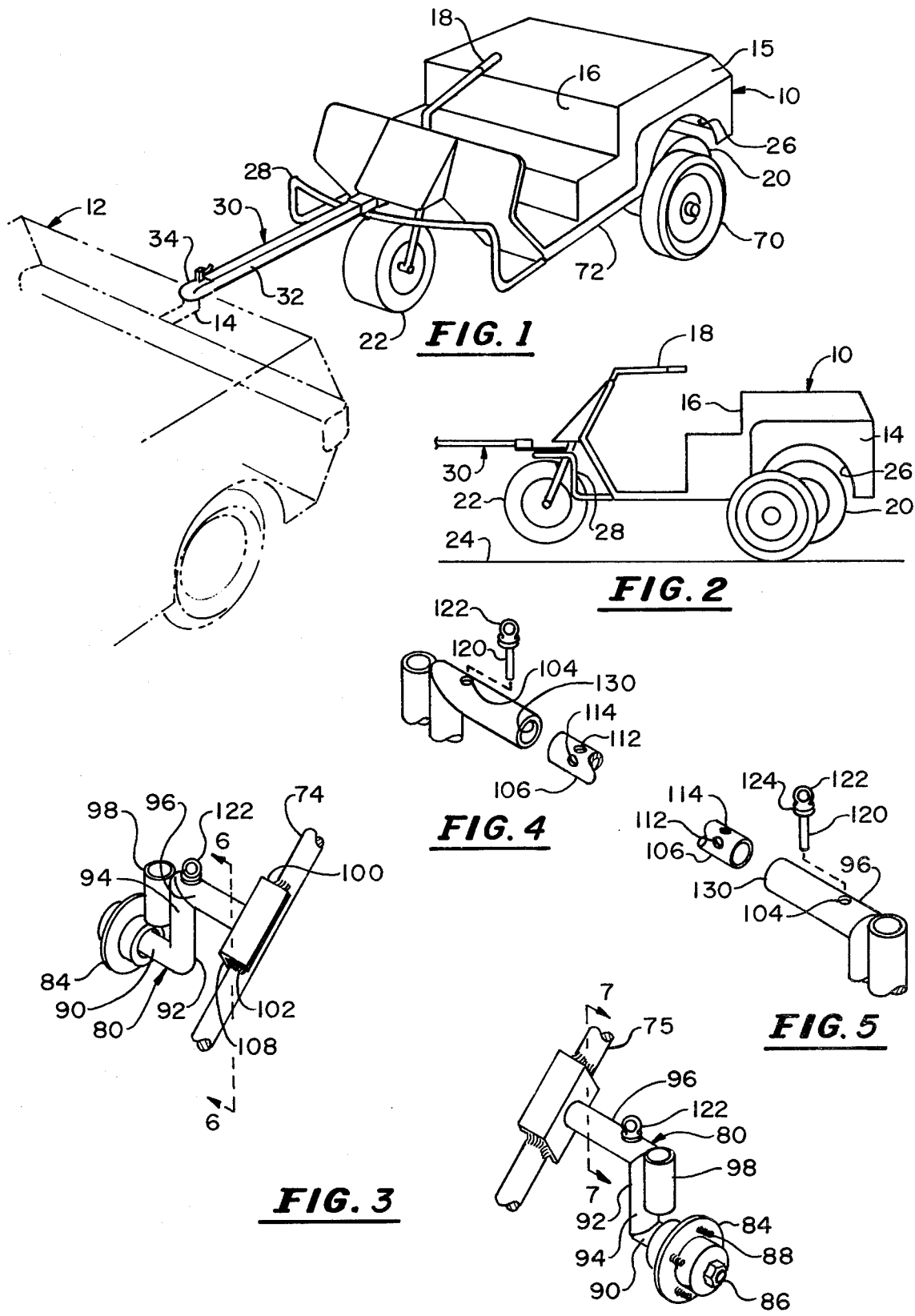

LEFT

RIGHT

AUXILIARY WHEELS FOR GOLF CART

BACKGROUND OF THE INVENTION

The prior art on tow bars and trailer hitches is prolific, and, much attention has been paid to the problem of providing removable bolt-on wheels for coupling to the sides of a boat to facilitate overland transportation and launching thereof. Brockelsby U.S. Pat. No. 3,986,723, for instance, discloses a removable wheel assembly for coupling a pair of rotatable wheels to a boat, thus to facilitate trailering or transportation by hand. In one embodiment the shaft holding the wheel has a groove around its circumference. This shaft fits through the side of the boat into a tubular socket member where it is engaged by a lock pin. The assembly allows the shaft to rotate but it retains it within the tubular socket against axial movement. The wheels are attachable in three positions to the bore, stability is provided by a U-shaped brace which attaches either forwardly or rearwardly of the assembly to provide alignment for the wheel. Other art is somewhat related with different means for attaching and moving the wheels for use on land or for positioning in an out-of-the-way position while the boat is in the water.

SUMMARY OF THE INVENTION

An object of this invention is to provide means for the quick and firm attachment of auxillary wheels to a golf cart or similar vehicle that can be used to raise the rear drive wheels from the ground. A feature of the invention is to provide means for using the wheel assembly to lift the golf cart onto the hitch wheels and raise it above ground level for trailering. In the lifted position the off-set swing axle automatically locks and is in position for trailering.

DESCRIPTION OF THE DRAWINGS

Illustrative embodiments of the invention is shown in the drawings wherein:

FIG. 1 is a perspective view of a golf cart equipped with the wheel and tow assembly of this invention in a towing position behind a car, shown in broken lines;

FIG. 2 is a fragmentary side view of the golf cart to illustrate the raised position of both the front and rear wheels during trailering;

FIG. 3 is a fragmentary perspective view showing portions of a tubular frame with one form of auxiliary wheel attachment in place;

FIG. 4 is a fragmentary perspective view to show the relationship of the frame support or stub axle and the female portion of the swing axle during assembly or dis-assembly on the right-hand side of the golf cart;

FIG. 5 is a fragmentary perspective view to show the relationship of the frame support or stub axle and the female portion of the swing axle during assembly or dis-assembly on the left-hand side of the golf cart;

DESCRIPTION OF ILLUSTRATIVE EMBODIMENTS

Figure 6:
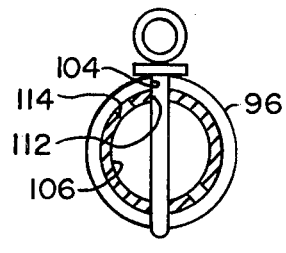
FIG. 6 is a cross-sectional view taken along the lines 6—6 of FIG. 3.

Referring to the drawings, particularly FIGS. 1 and 2, the golf cart 10 is shown hitched to a car 12 by means of its trailer hitch 14 which can be of any type. The cart 10 has a molded plastic body 15 including a seat 16, steering tiller 18 and is normally supported by a pair of rear wheels 20 (only one shown) and the front wheel 22 on the ground 24 when in use by the golfers. The cart 10 is merely illustrative of this type of unit and can have a pair of front steerable wheels instead of one such wheel. These units generally have a wheel well 26 for the rear wheels on each side of the molded body and various forms of front bumpers 28 for the attachment of the tongue assembly 30 which includes the tow bar 32 having the releasable socket 34 at one end that engages the ball of the car hitch 14.

Figure 11:
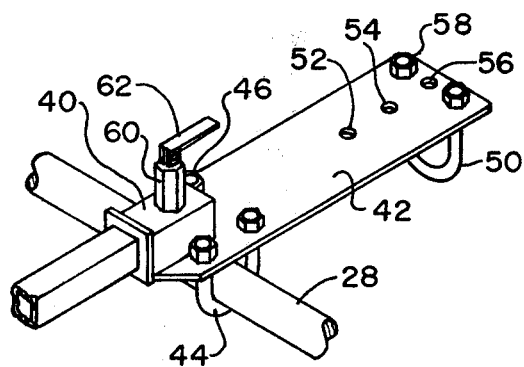
FIG. 11 is a fragmentary perspective view of the front hitch for a cart having a single front wheel.
Figure 12:
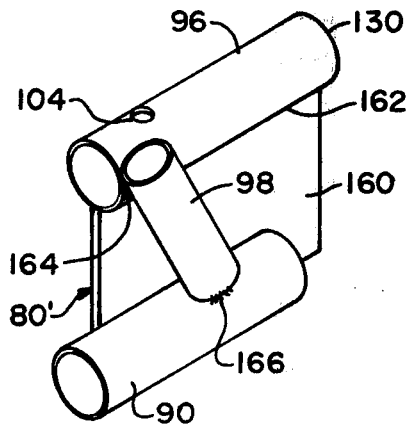
FIG. 12 is a perspective view of a modified swing axle.

The other end of the tow bar or tongue 32, which can be round or square in cross-section as desired, fits into a socket 40 (See FIG. 11) carried by the plate 42 having a front pair of U-bolts 44 and 46 that engage around the bumper 28 and a rear U-bolt 50 for engagement with a non-rotating part of the steering assembly. In FIG. 11, the U-bolt 50 is engaged in a pair of holes that are set transverse to the longitudinal axis of the plate 42 in order to encircle a frame or steering part that extends along this same axis. Additional bore holes 52, 54 and 56 are provided so that the U-bolt 50 can be set at two positions, i.e., in holes 52–54 and 54–56 with its opening transverse the longitudinal axis of the plate 42. The U-bolt 50 can also be set at an angle of 45° between the bore hole 54 and either the bore holes to which it is shown attached, by units 58 so that angular frame or steering nuts can be accommodated. This structure is not universal for all designs of golf cart frames but it does fit a wide variety of such units.

The socket 40 has a spring-loaded pin (not shown) within the vertical housing 60 that reciprocates upwardly by raising the pivot lever 62, to release the pin's engagement with a bore hole in the end of the tow bar 32. This spring-loaded pin assembly is a known construction and not part of this invention. FIG. 11 merely illustrates means for attaching the tow bar 32 to the front of the cart 10 in a manner such that the tow bar can be released from both the cart and car when not in use. However, the tow bar serves another function to be described.

In FIGS. 1 and 2 it is seen that the golf cart 10 carries the auxiliary wheels 70 (only one shown) on each side ahead of the drive wheels 20 of the cart and outside the body 14, which raise the rear wheels of the cart from the ground surface 24. Also, the cant-lever action of the front towing or tongue assembly 30 allows the front wheel 22 of the cart to be in a raised position. The cart is accordingly carried by the auxiliary wheels 70 and the tongue assembly 30 in a manner which transforms the cart into a two wheeled trailer.

A feature of the invention is the means for temporarily or permanently attaching the auxiliary wheels to the frame 72 of the cart 10. Golf carts generally have boxlike frames that include tubular spaced longitudinal side members illustrated at 74 (right side) and 75 (left side). These side members can be of various cross-sectional configurations, that is, they can be cylindrical, square (box beams), angle irons or I-beams. At that point in the frame where it passes over the axles for the wheels 20 these frame members 74 and 75 are generally arched and are not parallel to the ground. Also, in some constructions of these frames, the side frame members 74-75 may diverge or converge slightly toward the rear of the cart. This non-parallelism complicates the provision of auxiliary wheel supports for golf carts, in that the wheels 70 may tow in or out but this problem has been overcome by this invention. Another complication is the fact that the drive motor and transmission are located between the frame members 74 and 75 opposite the wheels 20 of the cart. This leaves little or no room for stabilizing or tie bars. Lastly, carts of this kind weigh in the order of 800 or more pounds and cannot be lifted except with a jack.

To overcome these difficulties one embodiment of this invention is shown in FIG. 3 wherein a pair of identical auxiliary wheel suspension assemblies 80 is shown. Each assembly includes a bearing hub 84 carried on a spindle 86 to which an auxiliary wheel 70 is rotatably attached by means of the wheel bolts 88. The spindles 86 are carried as an extension of the horizontal legs 90 of the Z-shaped swing axles 92 having the intermediate upright members 94 and the off-set horizontal leg or female portions 96 at the other ends. Each upright member 94 includes a tubular socket 98 for purposes to be described. The sockets 98 can be welded or otherwise attached or made part of the upright legs 94 and be positioned at any radial position thereon as long as they are clear of the auxiliary wheels and the side of the body 14, opposite the forward part of the wheel well 26.

The assemblies 80 each include the L-shaped mounting plate means 100 in the form of an angle iron which is welded, as at 102, to the angular frame members 74 and 75. Alternatively, suitably spaced bore holes to receive the pairs of U-bolts (not shown) can be provided for the plates 100 that engage around the frame members thereby temporarily affixing the plates to the frames on opposite sides.

Referring to FIGS. 3, 4 and 5, it is seen that the horizontal legs 96 are tubular and include a bore hole 104 that is positioned nearer the outer end, away from the frame members 74 and 75. The bore holes 104 extend through both the top and bottom walls of the horizontal legs 96, either diametrically or at an angle. The legs 96 encompass the stub axles 106 which are attached to the vertical side plates 108 of the mounting means 100 as by weldments 110 shown in FIG. 8.

The stub axles 96 each have a pair of bore holes 112 and 114 that are circumferentially spaced from each other, extend diametrically through the stub axles and are longitudinally spaced therealong so as to coincide with the bore holes 104 in the fully telescoped position of these parts for the purpose of receiving the quick-release lock pins 120 (See FIGS. 4 and 5).

These lock pins have shank portions that slideably engage through the matched holes and are long enough to extend through both of the telescoping parts. Each lock bolt 120 has an enlarged eye 122 for convenience in handling and a heavy metal or lead washer 124 is provided at the base of the eye, and encompassing the shank, to prevent the lock bolts from bouncing out of the holes. If desired, the ends of the shanks can be threaded to receive lock nuts.

It is desirable to have the vertical component 94 of the swing axle assemblies 80 in an essentially vertical position or at a slight trailing angle when attached to the frame members 74 (right) and 75 (left). Since these wheel support assemblies 80 are ahead of the drive wheels 20 of the cart, they must attach to the frame at those portions wherein they arch over the wheel well 26. This is shown in FIG. 3 by the upward angle of the frame portions 74 and 75 as they extend to the rear of the cart.

To accommodate this angular change from one side of the frame to the other and require minimal changes in the structures of these mating parts, the stub axles 106 have the pair of holes 112 and 114 that are displaced from each other by the same angular change. Accordingly, in attaching the wheel assembly 80 to the right side, the swing axle 92 is oriented so that the bore hole 112 registers with the bore hole 104 of the swing axle. And, for the left-hand side, the bore hole 114 registers with the bore hole 104. These two registered positions are shown in FIGS. 6 and 7.

Figure 7:
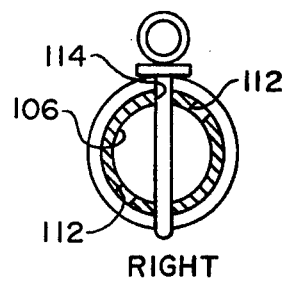
FIG. 7 is a cross-sectional view taken along the lines 7—7 of FIG. 3.

In FIG. 6, for the right side of the cart, the stub axle 106 is rotated by the angle of the frame 75 so that the bore hole 112 is uppermost, while in FIG. 7, the stub axle 106, being reversed, is rotated so that bore hole 114 is uppermost. The direction of travel of the cart is indicated by the arrow 126.

Figure 8:
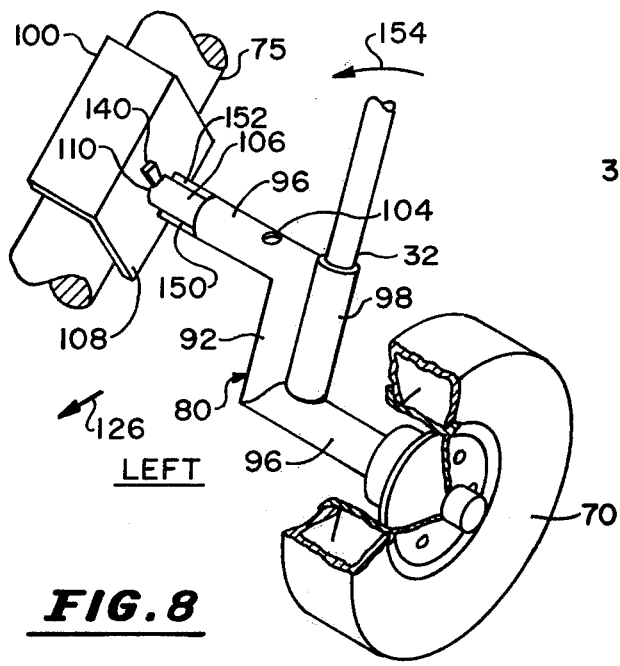
FIG. 8 is a fragmentary perspective view to illustrate a modified assembly and the use of the tow bar to raise the cart upon a wheel assembly on the left side thereof.
Figure 9:
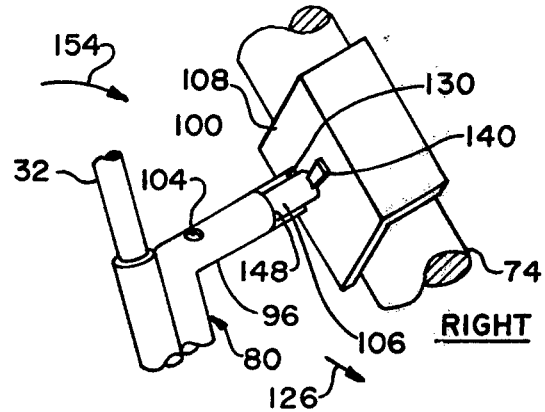
FIG. 9 is a view like FIG. 8 for the right side of the cart.

The outer or female legs 96 fully encompass the inner or male legs 106 so that their squared ends 130 abutt against the vertical plates 108 of the mounting means 100. To attach a swing axle 92 it is only necessary to insert its female legs 96 over the stub axle 106 with the wheel 70 angled forwardly or to the rear, place the tow bar 32 in the socket 98 and lever the swing axle to the vertical position, as illustrated in FIGS. 8 and 9. During this operation the end 130 of the leg 96 rotates against the plate 108 to insure proper longitudinal matching of the bore holes to receive the lock pins 120. At the same time, the wheel 70 takes the weight of the cart and the drive wheels 20 are raised from the ground. With both wheels so attached, the tow bar 32 is placed in the socket 40, by means of the lock pin in the housing 60, its coupling 34 is attached to the trailer hitch 14 and the cart is raised and ready for transport. Placement of the auxiliary wheels at the heaviest motor-end of the cart allows the cant-lever action of the tow bar to hold the cart in proper balance for trailering.

Figure 10:
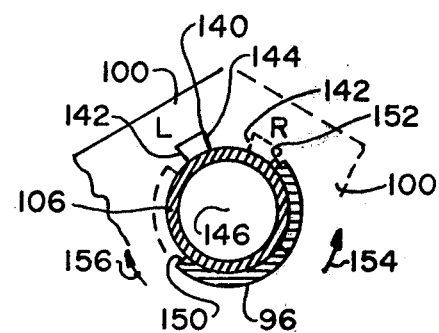
FIG. 10 is a cross-sectional view, partly diabrammatic to show the relative right and left-hand stop positions of the swing axles.

FIGS. 8, 9 and 10 illustrate another form of mounting means to include the stop cleat 140 attached to the vertical plate 108 of the mount 100. The cleat 140 has flat sides 142 and 144 which, preferably, lie in a plane which intersects the center 146 of the stub axle 106. Also, the cleats 140 are centered at the top of the stub axles 106 and define a peripheral stop on each side of top dead center of the stub axles. The radial depth of the cleats 140 is about the same as the wall thickness of the female legs 96.

The inner or extended ends 130 of the female legs 96 have been modified by a circumferential notch 148 defining the radially opposite stop surfaces 150 and 152. Thus, a wide notch is provided which is readily placed in alignment with the cleat 140 as the swing axle is slid into position.

FIGS. 8 and 10 show that on the left side, surface 144 of the stop cleat 140 is rotated counter-clock-wise to the "L" position because of the angular configuration of the frame 75. With the end 130 of the female leg 96 flush with the plate 108 and the lever 32 in place in the socket 98, the swing axle 80 is rotated counter-clock-wise in the direction of arrow 154 which brings the stop surface 152 against the wall 144 of the cleat 140, giving a slight trailing angle to the swing axle on this side of the cart. At the same time, bore hole 104 in the leg 96 is radially oriented with the bore holes 114 (FIG. 7).

For the right side of the cart (FIG. 9) the mounting plate 100 and the cleat 140 are oriented or rotated clockwise to the "R" position in FIG. 10. Thus, the assembly is rotated clock-wise in the direction of the arrow 156 to bring the stop surface 150 into contact with the flat side 142 of the stop cleat 140. Again, the swing axle assembly 80 is oriented to give a slight trailing angle to the wheel 70 as the bore hole 104 is radially oriented with the bore hole 112 (FIG. 6).

In these embodiments the depth of the notch 148 need be only slightly greater than the thickness of the cleats 140 to provide rotational clearance. This spacing is exaggerated in the drawings to facilitate the illustration.

Since the lateral depth of the wheel wells 26 of golf carts vary, as well as their weights, it is desirable to accommodate these changes. The embodiment in FIG. 11 is so designed to include the reinforcing plate 160 having the female legs 96 welded, as at 162, to its top edge while the horizontal leg 90 of this modified swing axle 80' is welded in an off-set positin on a lower side edge of the plate. This allows the placement of the tubular socket 98 on the side of the assembly and at an angle directed outwardly from the cart body, whereby it is welded to the side of the leg 96 at 164 and to the top of the leg 90 at 166. The attachment of the modified swing axle 80' to the stub axle 106 may be as shown in FIGS. 3 to 7 or as shown in FIGS. 8, 9 and 10.

From this description it is apparent that the upright legs 94 of the swing axles 80 must be long enough to raise the drive wheels 20 from the ground a sufficient distance for proper clearance during transport. Part of this clearance adjustment can be accomplished by placing the bracket means 100 at selected positions along the side frame members 74–75. Also, the horizontal legs 96 must extend far enough to provide clearance along the side of the body 14. The arrangement of the slot 148 and the stop cleat 140 can be reversed, that is, the cleat 140 can be carried on the leg 96 and the circumferential spacing defined by the ends 150 and 152 can be established by an appropriate half-ring welded to the face of the plate 108.

Similarly, the leg 106 can telescope outside the leg 96, in which event the cleat 140 can be carried on the outer end of the leg 96 and the slot 148 carried on the outer edge of the leg 106. By placing the wheels 70 ahead of the rear wheels of the cart at or near the center of gravity, the required balance of the cart to impart about a 60–80 lbs. vertical load on the tongue 32 at the hitch is attained, and safe trailering is ensured.

By using an angle plate as the frame mounting means 100, any toe-in or toe-out of the frame members 74 and 75 can be accommodated, simply by squaring the leg 106 to the side of the vehicle and welding the plates to the frame at those points where close contact occurs. Thin, flat pieces of metal can be used to build up any gaps as necessary and welded in place. The ame procedure can be used with a U-bolt form of attachment. The right-angle bracket 100 fits frame members having a variety of cross-sectional configurations. The position of the mounting plate or bracket 100 in relation to the leg 106 can be reversed so that one portion is under the frame member instead of being on top. The bracket 100 can also be U-shaped instead of an angle iron.

Other changes may be made in the construction and the arrangement of the parts or the elements of the various embodiments as disclosed herein without departing from the spirit and scope of the invention as defined in the following claims.

What is claimed is:

1. In a detachable trailering assembly for a golf cart or the like having side frame members and a major portion of its weight on the rear drive wheels thereof, the combination of:

a pair of stub axles each being attachable to a side frame member of said golf cart adjacent to and ahead of said rear drive wheels in an extended, horizontal position:

a pair of wheel assembies each including a supporting wheel at one end and an off-set swing axle at the other end;

each of said off-set swing axles having a leg member engageable with one of said stub axles in telescoping relationship and being rotatable thereby to a lowered position to raise said golf cart from the ground upon said supporting wheel;

said offset swing axles in said lowered position being in a trailing relationship from said stub axles in an arc rearwardly toward said rear drive wheels to thereby support said major weight portion of said golf cart; and means to lock each of said swing axles in said lowered supportive positions; and a tow bar attachable to the front of said golf cart in a cantilever towing position 2. An assembly in accordance with claim 1 wherein:

each of said off-set swing axles includes a socket member;

said detachable tow bar is engageable at one end with said socket members to rotate said swing axles to and from their lowered supportive positions.

3. In a detachable trailering assembly for a golf cart or the like, and having a transverse front bumper and frame portion and side frame members supporting drive wheel therefor, the combination of:

a pair of stub axles each attachable to the side frame members of said golf cart ahead of said drive wheels in an extended, horizontal position;

a pair of wheel assemblies each including a supporting wheel at one end and an off-set swing axle at the other end;

said off-set swing axles each having a leg member engageable with said stub axle in telescoping relatioship and a radially extending socket member, thereby being rotatable to a lowered position to raise said golf cart from the ground upon said supporting wheel;

a front hitch including means for longitudinal attachment between said bumper and frame position;

said front hitch including a hitch socket member and a tow bar;

said tow bar being normally detachably mounted in said hitch socket member in a towing position and when detached from said hich socket member being engageable at one end with said radial socket of said off-set swing axle to raise the rear wheels of said golf cart from the ground to a trailering position and means to lock said swing axles in said supportive and trailering positions.

4. In a detachable trailering assembly for a golf cart or the like having side frame members and a major portion of its weight on the rear drive wheels thereof, the combination of:
   a pair of stub axles attachable to a side frame member of said golf cart in an extended, horizontal position;
   a pair of wheel assemblies each including a supporting wheel at one end and off-set swing axle at the other end;
   each of said off-set swing axles having a leg member engageable with one of said stub axles in telescoping relationship and being rotatable thereby to a lowered position to raise said golf cart from the ground upon said supporting wheel;
   said offset swing axles in said lowered position being in a trailing relationship from said stub axles in an arc rearwardly toward said rear drive wheels to thereby support said major weight portion of said golf cart;
   means to lock said swing axle in said lowered supportive position including alignable bore holes in said leg member and stub axle;
   pin means are provided to engage said aligned bore holes;
   said bore holes being circumferentially aligned and sufficiently off-set to allow the locking of said swing axle with said pin means in said rearward arc on both sides of said frame whereby a pair of said assemblies can be interchangeably attached to a stub axle on both sides of said golf cart.

5. A detachable trailer wheel assembly for attachment to the side frame member of a vehicle comprising;
   bracket means attachable to the side frame member of said vehicle, and including a base plate and a stop member;
   a stub axle supported from said base plate of said bracket means for extension of said stub axle from the side of said vehicle;
   a swing axle including oppositely directed, laterally off-set, substantially parallel leg members;
   one of said leg members including a rotatably-mounted wheel member at one end;
   the other of said leg members being engageable over said stub axle in telescoping and rotatable relationship;
   a peripheral notch in the inner end of said other leg member for engagement on the sides of said stop member;
   a socket member on said swing axle with its longitudinal axis along the plane of said leg members with an open end directed away from said one leg member and said wheel member;
   releasable locking means between said telescoping stub axle and said other leg member adapted to hold said wheel member in a substantially vertical depending position; and
   lever means for engagement with said socket member whereby to pivot said axle into said depending position for engagement of said locking means and support said vehicle on said wheel member.

6. A detachable trailer wheel assembly in accordance with claim 5 in which:
   said releasable locking means comprises a pin member;
   at least a pair of said bore holes are included in said leg member; and
   one of said bore holes is circumferentially off-set from the other whereby said pin means is insertable in said bore holes and the vertical angle of said swing axle is adjustable.

7. A detachable trailer wheel assembly: comprising:
   bracket means attachable to the side frame member of said vehicle;
   comprising an angle iron section supporting a stub axle from one of its plates, the remaining plate extending over a side of said frame member with said
   stub axle extending from the side of said vehicle;
   a swing axle including oppositely directed, laterally off-set, substantially parallel leg members;
   one of said leg members including a rotatably-mounted wheel member at one end;
   the other of said leg members being engageable with said stub axle in telescoping and rotatable relationship;
   a socket member on said swing axle with its longitudinal axis along the plane of said leg members with an open end directed away from said one leg member and said wheel member;
   releasable locking means between said telescoping stub axle and said other leg member adapted to hold said wheel member in a substantially vertical depending position; and
   lever means for engagement with said socket member whereby to pivot said swing axle into said depending position for engagement of said locking means and support said vehicle on said wheel member.

* * * * *